March 19, 1963  R. E. REASON  3,081,552
SUSPENSION DEVICES
Filed April 17, 1961  2 Sheets-Sheet 1
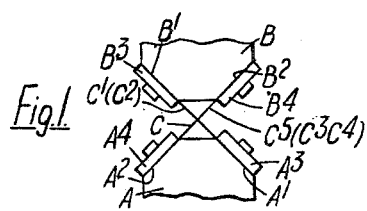
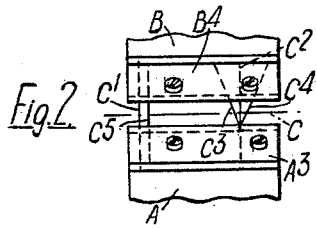
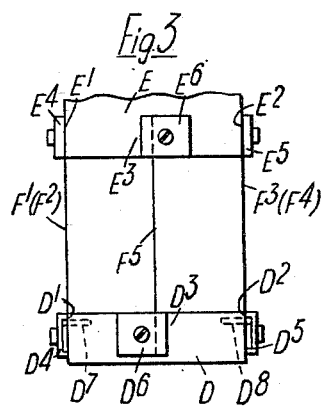
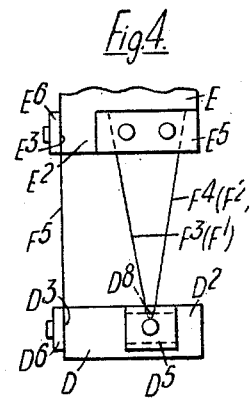
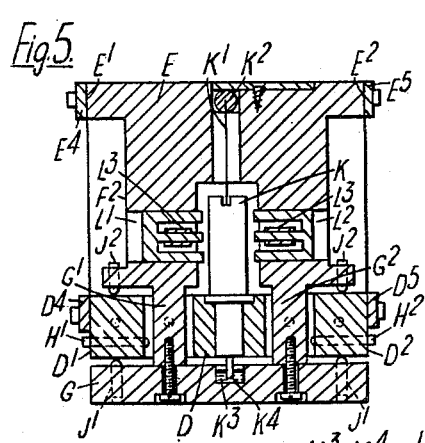
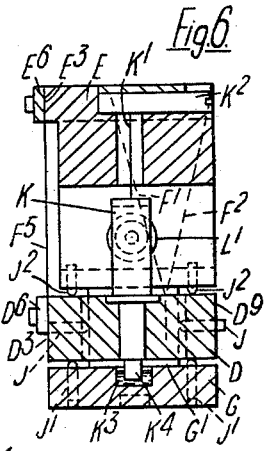
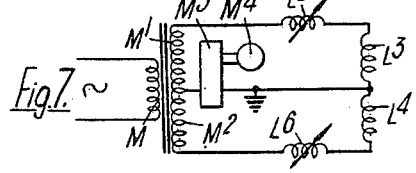
Inventor
R. E. Reason
By
Attorneys March 19, 1963 R. E. REASON 3,081,552
SUSPENSION DEVICES
Filed April 17, 1961 2 Sheets-Sheet 2
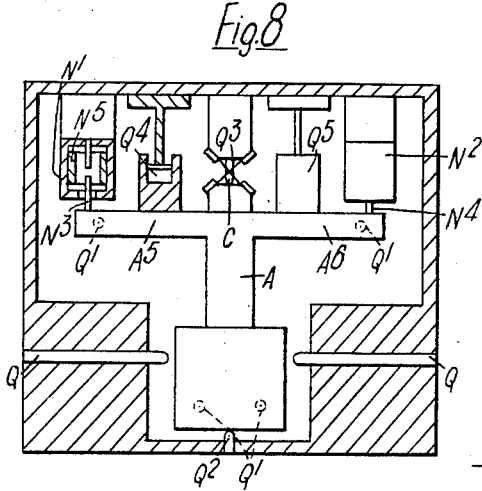
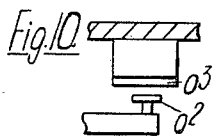
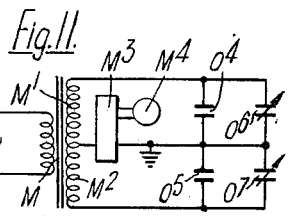
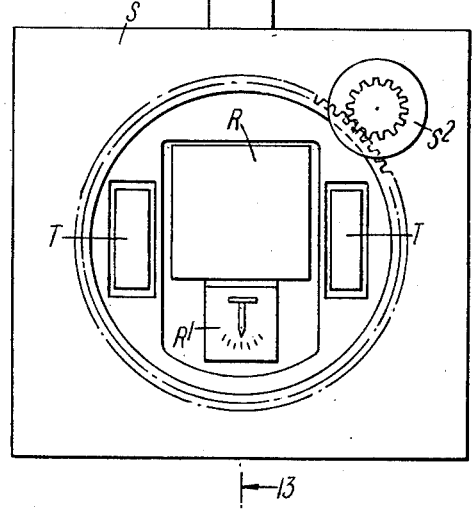
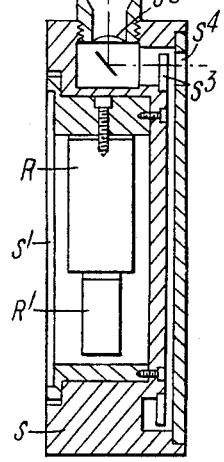
Inventor
R. E. Reason
By
Attorneys United States Patent Office 3,081,552
Patented Mar. 19, 1963

3,081,552
SUSPENSION DEVICES
Richard Edmund Reason, Leicester, England, assignor to Rank Precision Industries Limited, Leicester, England, a company of Great Britain
Filed Apr. 17, 1961, Ser. No. 103,462
Claims priority, application Great Britain Apr. 20, 1960
16 Claims. (Cl. 33—215)

This invention relates to a suspension device and also to apparatus, incorporating such suspension device, for indicating level or for measuring departure therefrom.

Precision level indicating apparatus has been proposed, which can be used in much the same manner as the well-known spirit level, but gives a far higher degree of accuracy and speed of indication than a spirit level. One arrangement of such apparatus comprises a generally T-shaped pendulum pivotally suspended within a casing, and electric transducer means carried by the casing and responsive to the movements of the ends of the cross-bar of the T of the pendulum for giving a resultant electrical output which is a measure of the inclination of the longitudinal axis of the pendulum to a zero axis which is fixed in position relatively to the casing and lies vertically in the normal level position of the casing. In order to get a high degree of accuracy in the measurement in such apparatus, it is necessary to employ an accurate hinge type of suspension for the pendulum, such as a pair of crossed ligaments each having substantial rigidity in a direction at right angles to the operative plane of movement of the pendulum axis, but difficulty arises in providing adequate protection against risk of damage to such ligaments as the result of shocks, without interference with satisfactory normal operation of the apparatus.

The present invention has for its object to provide an improved suspension device, which, whilst otherwise applicable, is especially useful for precision level measuring or indicating apparatus, and has the advantage of materially increasing the capability of the apparatus to withstand shocks without serious loss of lateral stiffness in the suspension, and at the same time of facilitating manufacture and reducing the cost thereof.

In the suspension device, according to the present invention, a movable mass is suspended from a framework by means of five filaments, of which not more than three lie along concurrent straight lines and not more than three are coplanar, whilst not more than two are both coplanar and parallel, the five filaments all being always in tension (during practical use of the apparatus within its operative range, and notwithstanding any slight errors in the lengths of the filaments), whereby the movable mass has one degree of freedom relatively to the framework, the five filaments being so disposed that the vertical straight line through the centre of gravity of the movable mass passes, in the zero position, between the anchorages of the filaments both to the framework and to the movable mass, and that the five filaments include two which are oppositely inclined to the plane through such vertical line lying at right angles to the operative direction of movement of the mass.

The one degree of freedom for the movable mass may be rotational, the five filaments in the zero position lying along straight lines all of which intersect a single straight line, which constitutes the instantaneous axis of rotation of the movable mass or is parallel thereto.

In a preferred arrangement of this kind, three of the filaments lie, in the zero position, in a first plane and the other two in a second plane, the line of intersection of the two planes constituting the instantaneous axis of rotation or being parallel thereto. In such case, preferably, in at least one of the two planes, two filaments are inclined in opposite directions to the line of intersection of the two planes. Again, preferably, in the first of the two planes, two of the filaments inclined to one another at a substantial angle are secured to the movable mass at anchorages in close proximity to one another, whilst the third filament is secured to the movable mass at a point remote from such anchorages.

Alternatively, the one degree of freedom for the movable mass may be translational in the sense that every straight line of the mass remains parallel to its original direction throughout the movement, which is compounded of a main translational movement in a generally horizontal direction and a relatively small translational movement in a generally vertical direction. In such case, preferably, in the zero position, the five filaments lie in parallel planes, not less than two in number, at right angles to the direction of the main translational movement.

In a preferred arrangement of this kind, the five filaments lie in three parallel planes, two in one plane, two in another plane, and the fifth in a third plane. Preferably, in each of the first two planes, the two filaments are oppositely inclined to a straight line parallel to the fifth filament and are secured to the movable mass at anchorages in close proximity to one another, whilst the fifth filament is secured to the movable mass at a point remote from the straight lines joining the anchorages in the first two planes.

In all the arrangements, according to the invention, stops are preferably provided on the framework to prevent any appreciable movement of the movable mass relatively thereto in directions other than the operative direction of movement. Stops are also preferably provided to limit the range of movement of the movable mass in the operative direction.

A further feature of the invention relates to apparatus for indicating level or measuring departure therefrom, and in the apparatus according to this feature of the invention a suspension device according to the main feature of the invention is combined with electric transducer means responsive to the operative movement of the movable mass relative to the framework and giving an electrical output which is a measure of the inclination to the vertical of a datum axis of the framework. The electric transducer means preferably comprises two transducers carried by the framework and having their moving members (or a moving member common to the two transducers) carried by the movable mass, the two transducers being differentially responsive to the operative movement of the movable mass relative to the framework and giving electrical outputs which can be combined to give the desired resultant output.

Means are preferably provided for damping the movement of the movable mass whereby it will rapidly assume its operative position without appreciable oscillation about such position.

The invention may be carried into practice in various ways, but some convenient practical constructions of suspension device according thereto, and also of level indicating apparatus incorporating such constructions, are illustrated by way of example in the accompanying drawings, in which FIGURES 1 and 2 are respectively front and side views of one construction of suspension device, FIGURES 3 and 4 are similar views of an alternative construction of suspension device, FIGURES 5 and 6 are central sectional views at right angles of a construction of level indicating apparatus, incorporating the suspension device of FIGURES 3 and 4, FIGURE 7 is an electrical circuit diagram associated with the construction of FIGURES 5 and 6, FIGURE 8 is a view similar to that of FIGURE 5 showing an alternative construction of level indicating apparatus incorporating the suspension device of FIGURES 1 and 2, FIGURES 9 and 10 respectively illustrate two alternative forms of transducer for use in such level indicating apparatus, FIGURE 11 is an electrical circuit diagram associated with the transducers of FIGURES 9 and 10, FIGURE 12 is a front view of a precision clinometer incorporating the level indicating apparatus of FIGURES 5 and 6 or of FIGURE 8, and FIGURE 13 is a transverse section through the clinometer of FIGURE 12, taken on the line 13—13 thereof.

In the construction of suspension device shown in FIGURES 1 and 2, the movable mass A is suspended from a block B by means of five flexible wires $C^1$, $C^2$, $C^3$, $C^4$, $C^5$ arranged in two planes which, in the normal zero position of the movable mass A, are equally inclined to the vertical and intersect one another in a horizontal straight line C in the space between the block B and the mass A.

For this purpose, the block B is provided with two flat faces $B^1$, $B^2$ equally inclined to a vertical datum plane through the zero position of the line of intersection C, and the upper ends of the flexible wires are clamped to such faces by means of clamping plates $B^3$, $B^4$. The movable mass A is also provided with two inclined faces $A^1$, $A^2$ which in the normal position are coplanar respectively with the two inclined faces $B^1$ and $B^2$ on the block B, the lower ends of the wires being clamped to such faces by means of clamping plates $A^3$, $A^4$.

In the first of the two planes, containing the inclined faces $A^1$ and $B^1$, there are two wires $C^1$ and $C^2$ spaced apart and each at right angles to the line of intersection C.

In the second plane, containing the inclined faces $A^2$ and $B^2$, there are three wires $C^3$, $C^4$ and $C^5$, two of which $C^4$, $C^5$, are arranged in V-formation with their lower anchorages in close proximity to one another and their upper anchorages spaced apart, whilst the third wire $C^5$ extends approximately at right angles to the line of intersection C between the two planes in a position widely spaced away from the apex of the V formed by the two wires $C^3$ and $C^4$.

The five wires thus constitute a kinematic suspension system, with all the wires always maintained in tension by the weight of the movable mass A, and the lengths of the wires are such that the operative edges of the four clamping plates $A^3$, $A^4$, $B^3$, $B^4$, which define the effective anchorage points of the wires, are all horizontal and parallel to one another and to the vertical datum plane.

It will be clear that, since all five wires are always in tension, the apex of the V is constrained to move in a circular arc about the operative edge of the clamping plate defining its two upper anchorage points, such circular arc lying in a plane at right angles to the vertical datum plane. The other wires prevent any rotation of the movable mass about the apex of the V. Thus the constraint is such that every point of the movable mass moves slightly only in the plane through it at right angles to the vertical datum plane. The movement of the mass A consists of a rotational movement about the line of intersection C of the two planes containing the wires, but it is to be noted that such line of intersection itself moves during the movement (always remaining parallel to the vertical datum plane) and constitutes an instantaneous axis of rotation in each position.

In the foregoing description, it has been assumed that the framework block B, from which the movable mass is suspended, is fixed in the position in which the operative edges of the clamping plates, and therefore also the line of intersection C of the two planes containing the wires, are accurately horizontal. The suspension, however, is such as to hold the movable mass A suspended properly in relation to the block B even when there may be a substantial lateral tilt of the block, the limit being reached when the tension in one of the wires of the V falls to zero. Any further tilt beyond such angle will make such wire slack, so that the movable mass will no longer be held in proper relationship to the block. Since, however, in practice, the V-angles will be quite considerable, quite a large angle of lateral tilt would be needed to render the device inoperative.

In order to guard against damage to the wires due to shock, it is desirable (as will be described in detail later with reference to FIGURE 8) to provide stops on the framework above and beneath the movable mass and also at the sides thereof, such stops being only just clear of the surfaces of the mass, so as to leave the mass free to move in its operative direction on either side of its normal zero position, but substantially to prevent any movement in other directions.

Although the wires used for the suspension will be thin and flexible, they will nevertheless offer some slight degree of resistance to excessive bending, and it is desirable therefore to provide further stops to limit the range of movement of the movable mass in the operative direction.

In an alternative construction of suspension device, shown in FIGURES 3 and 4, the movable mass D is suspended from the block E (which may form part of the framework or may be resiliently carried by the framework) by means of five wires $F^1$, $F^2$, $F^3$, $F^4$, $F^5$ lying in three parallel planes, which extend vertically in the normal zero position of the movable mass D. Two of the three planes each contain two wires, $F^1$, $F^2$ and $F^3$, $F^4$ respectively, arranged in V-formation, with their anchorages to the movable mass D in close proximity to one another and with their anchorages to the block E spaced apart, the lengths of the four wires being equal to one another as also are the angles of the two V's. The third plane, which may conveniently lie between the first two planes, contains a single wire $F^5$ extending vertically in the normal zero position, the anchorage of this wire to the movable mass D being widely spaced away from the line joining the apices of the two V's.

The wires $F^1$, $F^2$ forming one of the V's are clamped at the apex of the V to a vertical face $D^1$ on the movable mass D by a clamping plate $D^4$, and at their upper ends to a vertical face $E^1$ on the block E by a clamping plate $E^4$. The wires $F^3$, $F^4$ forming the other V are clamped at the apex of the V to a vertical face $D^2$ on the movable mass D by a clamping plate $D^5$, and at their upper ends to a vertical face $E^2$ on the block E by a clamping plate $D^6$. The fifth wire $F^5$ is clamped at its lower and upper ends respectively to vertical faces $D^3$ and $E^3$ by clamping plates $D^6$ and $E^6$. The vertical faces $D^1$, $D^2$, $E^1$, $E^2$ associated with the two V's are all parallel to one another, whilst the faces $D^3$, $E^3$ for the fifth wire $F^5$ are at right angles to those for the V wires. FIGURES 3 and 4 serve, by way of example, to illustrate a method of clamping the wires at the apices of the V's, different from that indicated in FIGURES 1 and 2, where the clamped ends of the two wires at each V apex lie side by side and close together. In this alternative, the two wires forming the V are parts of a single piece of wire passing round a small pin $D^7$ or $D^8$ projecting out from the movable mass D into a recess in the clamping plate $D^4$ or $D^5$, the clamping being effected by the portion of the clamping plate above such recess.

It will be clear that the two V's $F^1$, $F^2$ and $F^3$, $F^4$ constitute the equivalent of a parallel-motion linkage, so that the apices of the two V's each move along circular arcs in vertical planes (or, as shown, in the same vertical plane) at right angles to the three planes of the suspension and the movement of the line joining such apices is such that it always remains parallel to its original direction, whilst the anchorage of the fifth wire $F^5$ to the movable mass moves along a similar circular arc in another vertical plane at right angles to the three planes of suspension and thus prevents rotation of the movable mass about the line joining the apices of the two V's. The whole mass thus performs a parallel translational movement, all points of the mass moving along equal circular arcs in vertical planes perpendicular to the three planes of suspension.

Here again, in order to guard against damage due to shock, it is desirable (as will be described below with reference to FIGURES 5 and 6) to provide stops on the framework above and beneath and at the sides of the movable mass D, so as substantially to prevent any movement thereof except in the operative direction, and also further stops to limit the range of movement in the operative direction. The wires are preferably of considerable length in relation to the range of movement of the mass in the operative direction, so that within such limited range the movement is substantially a straight line movement.

As in the first construction, the wires will hold the movable mass D suspended in proper relationship to the framework even if the framework is tilted out of the vertical position, provided that the angle of lateral tilt is not large enough to reduce the tension in any of the wires of the two V's to zero. Again, it is not essential to this arrangement that the two V's should have equal angles or indeed that the two wires in either of the first two planes should be in V formation, provided that they are oppositely inclined to a vertical plane at right angles to their own plane and that their lengths and inclinations are such that the anchorages of all five wires to the movable mass are constrained to perform equal circular arc movements in planes at right angles to the three parallel suspension planes.

It will be appreciated that, although the two arrangements of suspension device above described, in which the five wires lie respectively in two crossing planes and in three parallel planes, are preferred, the five wires may be arranged in other ways to afford a true kinematic suspension for the movable mass, wherein all five wires are maintained in tension without redundant wires and the movable mass has one degree of freedom to effect an operative movement on either side of a stable normal zero position. For this purpose, there must not be more than three wires in lines passing through a single point, nor more than three wires in a single plane, and where there are three wires in one plane not more than two may be parallel to one another. In the normal zero position, the vertical straight line through the centre of gravity of the moving mass A or D must pass within the areas marked out by the five anchorages to the block B or E and by the five anchorages to the moving mass A or D, and there must be at least one pair of wires oppositely inclined to the vertical plane, which passes through such straight line at right angles to the direction of movement of the movable mass.

In the case when the one degree of freedom for the movable mass is rotational, the five wires must all lie along straight lines intersecting a single straight line, which itself moves and constitutes the instantaneous axis of rotation for the movable mass in each position. When three of the wires lie along straight lines passing through a single point, each of the remaining two wires must intersect at an angle the plane of the other and such single point, and the instantaneous axis of rotation is the straight line passing through such points of intersection.

Translational movement of the movable mass is obtainable only in the sense of parallel movement, since the anchorage of each wire to the movable mass is necessarily constrained to swing about the anchorage of the wire to the framework, but a close approximation to translational movement along a single straight path can be obtained by making the wires long in comparison with the range of operative movement. Such translational movement can most readily be obtained by arranging the wires in a series of two or more spaced parallel planes, and in such case, if the straight lines along which the wires lie are orthogonally projected on to any one of such planes, there should be at least one such projection widely spaced from every intersecting point of the projections. The second construction described above constitutes one such arrangement.

One important practical application of the suspension device according to the invention is to precision apparatus for indicating level or for measuring departure from level, and the following may be instanced as a preferred construction of such level indicating or measuring apparatus, incorporating the second construction of suspension device described above. This construction is illustrated in FIGURES 5 and 6 and, as far as the suspension device is concerned, uses the same reference letters as FIGURES 3 and 4.

This apparatus is intended to be used after the manner of an ordinary spirit level, but giving a far higher degree of accuracy than is obtainable with a spirit level. The framework of the apparatus has a base plate G having an accurately formed flat lower surface, which constitutes a datum face for the apparatus and rests on the surface whose level is to be tested.

The movable mass D is in the form of a rectangular plate which is suspended just above the base plate G by the five-wire suspension device from a body E which is connected to the base plate G by means of two legs $G^1$, $G^2$ passing through holes or recesses in the movable mass D. The spaced upper ends of the wires $F^1$, $F^2$ and $F^3$, $F^4$ of the two V's are anchored respectively to the two vertical end faces $E^1$ and $E^2$ of the top part of the body E by means of clamping plates $E^4$ and $E^5$, whilst the lower ends of the wires of each V are clamped in close proximity to one another to the appropriate end face $D^1$ or $D^2$ of the rectangular plate constituting the movable mass D, the apex of the V lying much further from the front face $D^3$ of the movable mass D than from the rear face $D^9$. The fifth wire $F^5$ is similarly clamped to the front faces $E^3$ and $D^3$ of the top part of the body E and of the movable mass D approximately in the middle of such faces. The movable mass D is thus free to swing in a generally horizontal direction parallel to its front and rear faces, the range of movement being limited by the framework brackets $G^1$ and $G^2$ which support the top plate E. To enable the range of movement to be controlled the movable mass D carries adjustable screws $H^1$ and $H^2$ whose rounded ends come into engagement respectively with the side faces of the framework brackets $G^1$ and $G^2$ at the ends of the range of movement.

The front and rear faces of the brackets $G^1$ and $G^2$ also constitute stops for substantially preventing any forward or rearward movement of the movable mass due to shocks, the movable mass carrying adjustable screws J whose rounded ends lie only just clear of the faces of the brackets. Further adjustable screws $J^1$ pass through the base plate G into close proximity with the lower face of the movable mass D, and other adjustable screws $J^2$ pass downwardly through lateral projections on the brackets $G^1$, $G^2$ into close proximity with the upper face of the movable mass D, thus acting as stops substantially to prevent upward or downward movement of the movable mass due to shocks.

Projecting upwardly from the movable mass D is a bar K of magnetic material which passes between two electromagnetic transducers $L^1$ and $L^2$ mounted in the body E, such bar constituting an armature common to the two transducers and moving, as the movable mass swings on its suspension device, towards one transducer and away from the other in the gap between the pole pieces of the two transducers. Each transducer $L^1$ or $L^2$ may conveniently consist of a magnetic core of cylindrical or other form having an E-shaped cross-section with a winding $L^3$ or $L^4$ on its centre limb, the free ends of the limbs of the core constituting the pole pieces, with which the magnetic bar K on the movable mass D cooperates. Thus, movement of the movable mass relatively to the framework in one direction will cause the inductance of the winding $L^3$ of one transducer $L^1$ to increase and the inductance of the winding $L^4$ of the other transducer $L^2$ to decrease, and vice versa. The two transducer winding $L^3$ and $L^4$ are connected in two of the arms of a bridge circuit (see FIGURE 7) energised from a suitable source through a transformer M, the other two arms of the bridge containing equal inductances constituted by the two halves $M^1$, $M^2$ of the secondary winding of the transformer M. The output of the bridge is amplified in an amplifier indicated at $M^3$ and is passed to an indicating meter $M^4$, which thus gives an accurate measurement of the extent of movement of the movable mass D relatively to the framework, in accordance with any departure from level in the surface on which the base plate G rests. If desired, the amplified output of the bridge circuit may be utilised to perform some control operation, such for example as an operation to cause automatic correction of the level of the surface on which the base plate G rests.

It will usually be desirable to provide means for accurately setting the zero of the level indicating apparatus, such zero-setting of course being effected when the base plate G is resting on a surface known to be accurately level. This zero-setting may be effected electrically by providing two relatively insensitive variable inductances $L^5$, $L^6$ respectively in series with the two fixed inductances $M^1$, $M^2$ of the bridge circuit, such inductances being operated to bring the indicating meter position accurately to its centre zero position when the base plate G is resting on the accurately level surface. Alternatively, zero-setting may be effected mechanically within the apparatus by slightly biassing the movable mass D to one side or the other of its nominal zero position to bring the indicating meter pointer accurately to its centre zero position when the base plate G is resting on the accurately level surface. Such biassing may be effected by means of an adjustable spring acting on the movable mass, or alternatively (as shown in FIGURES 5 and 6) by a wire $K^1$ engaging in a slot in the upward projection K from the movable mass D and carried at its upper end by a rotatable member, such as a cylindrical roller $K^2$ whose axis is at right angles to the direction of movement of the mass D. Thus angular adjustment of the roller $K^2$ about its axis will cause the wire $K^1$ to exert a slight biassing force on the movable mass D to effect the desired zero adjustment.

It is also usually desirable to provide damping means in order to minimise oscillation of the movable mass about its operative position. Various forms of damping means may be used, such for example as a bath $K^3$ of viscous liquid into which a paddle-like projection $K^4$ from the movable mass D dips or any of the well-known dash-pot damping arrangements.

FIGURE 8 shows an alternative arrangement of level indicating apparatus, wherein the movable mass has a rotational movement, as in the suspension device of FIGURES 1 and 2. In this case, it is preferable to mount the two transducers of the apparatus at equal distances on opposite sides of the hinge axis constituted by the line of intersection C of the two crossing planes containing the wires of the suspension device. For this purpose, the movable mass A is in the form of a pendulum, generally of T-shape with two arms $A^5$, $A^6$ projecting laterally from a point just beneath the lower anchorages of the suspension wires, such arms respectively carrying at their ends the movable elements of the two transducers $N^1$, $N^2$, which are so mounted as to be sensitive to upward and downward movements of their movable elements. Each transducer may be of the electromagnetic kind above described in connection with FIGURES 5 and 6, having a moving armature cooperating with the poles of an E-shaped magnetic core bearing a winding on its centre limb, but (as in the case of the arrangement of FIGURES 5 and 6) the transducer may be arranged in a variety of other ways, and FIGURE 8, by way of variant, shows an electromagnetic transducer of the kind comprising a magnetic pot into which a rod-like moving element $N^3$ (or $N^4$) carried by the associated arm $A^5$ (or $A^6$) of the movable mass A protrudes to a greater or less extent in accordance with the movement of the mass A and thus varies the inductance of a coil $N^5$ linked with the magnetic circuit. The coils of the two transducers control an output bridge circuit in the same manner as the coils $L^3$, $L^4$ in the circuit shown in FIGURE 7.

Further alternative forms of transducer, which may be used, are shown, by way of example, in FIGURES 9 and 10. Thus, FIGURE 9 shows a transducer in the form of a variable capacitance, in which the moving element carried by the movable mass A consists of one or more vertically mounted electrode plates O interleaved with fixed vertical electrode plates $O^1$, the moving plate or plates O overlapping the fixed plate or plates $O^1$ to a variable extent dependent upon the movement of the movable mass. FIGURE 10 shows another form of capacitative transducer having a movable horizontal electrode plate $O^2$ carried by the movable mass A and cooperating with a fixed horizontal plate $O^2$ carried by the movable mass A and cooperating with a fixed horizontal electrode plate $O^3$, the movement in this case acting to vary the thickness of the airgap between the two plates. In all such cases the variable outputs of the two transducers are applied differentially to a bridge circuit analogous to that of FIGURE 7. FIGURE 11 shows a modification of such bridge circuit suitable for capacitative transducers, the two capacitances constituted by the two transducers being indicated at $O^4$ and $O^5$ respectively, whilst the associated zero-setting elements consist of variable capacitances $O^6$ and $O^7$.

Whilst the use of two differentially arranged transducers is preferred, it is also possible to use a single transducer, whose inductance or capacitance or resistance varies in accordance with the movement of the movable mass and is compared in an output bridge circuit with a fixed inductance or capacitance or resistance. In such case, the single transducer should be arranged, as far as is practicable, to be insensitive to movements of the movable mass in directions other than the operative direction, resulting for example from shock. When two transducers are used, it will usually be possible (as in the various transducer arrangements above described) to arrange them so that the effects of such shock movements of the movable mass in directions other than the operative direction cancel each other out in the bridge circuit.

The level indicating apparatus of FIGURE 8 is provided with stops, in the manner described above for substantially preventing movement of the movable mass in directions other than the operative direction and also for limiting movement in the operative direction in order to minimise risk of damage to the wires of the suspension device. Thus, adjustable screws Q are provided in the walls of the framework of the apparatus, whose rounded ends lie in the path of movement of the movable mass A and thus limit movement thereof in the operative direction. In addition, similar screw stops $Q^1$ are provided in the front and rear walls of the framework, which very nearly abut against the surfaces of the movable member A and of the arms $A^5$, $A^6$ with as little clearance as possible in order substantially to prevent lateral movement of the movable member at right angles to the operative direction. A further screw stop or stops $Q^2$ are provided in the base of the framework substantially to prevent downward movement of the movable member, and upward movement thereof is likewise substantially prevented by a screw stop $Q^3$ secured to the suspension block B and almost abutting against the upper surface of the movable member. FIGURE 8 also serves to illustrate an alternative arrangement for damping the movement of the movable member, employing two dash-pots $Q^4$, $Q^5$, the movable elements of which are respectively carried by the two lateral arms A⁵ and A⁶ of the movable member.

The level indicating apparatus, whether in the form shown in FIGURES 5 and 6 or in that of FIGURE 8, is primarily intended for the precision measurement of very small errors in level, but it may also be used, if desired, as a null measurement device or fractionating device in apparatus responsive to larger angular changes, as in a clinometer. One such arrangement is shown in FIGURES 12 and 13. In this arrangement, the level indicating apparatus, indicated at R, together with its indicating meter R¹, is rotatably mounted in the casing S of the clinometer behind a window S¹, the rotation being effected, for example, by means of a hand knob S². The rotatable body carries a transparent scale S³ which moves past a light opening S⁴ in the casing and can be viewed in the well-known manner against an index mark or vernier through a microscope S⁵ which may be mounted in a tube S⁶ projecting from the top of the casing S. The associated electrical circuits may be housed in boxes T carried by the rotatable body.

In operation, when the clinometer is in position to measure the desired inclination, the pointer of the indicating meter R¹ will be at one end of its scale. The hand knob S² is operated until the meter pointer moves from the end of its scale, thus indicating that the level indicating apparatus R is approximately vertical. The rotation of the hand knob S² is stopped when one graduation of the scale S³, as viewed through the microscope S⁵ is exactly in the reading position, when the departure of the reading on the indicating meter R¹ from its zero position will give the necessary correction to be added to the reading on the scale S³. The spaces between consecutive graduations on the scale S³ should, of course, correspond to the full length of the meter scale. For instance, it is readily possible to obtain an accuracy of, say, five minutes of arc by direct optical reading of the scale S³, and if the meter scale has a range of five minutes and contains sixty graduations within such range, the final measurement can be read to an accuracy of five seconds of arc or, by estimation, even to 2½ seconds of arc. If desired, the meter may be used for fractionating sub-divisions of the scale S³ indicated by a vernier.

It will be appreciated that the foregoing arrangements of level indicating apparatus have been described by way of example only and may be modified in various ways within the scope of the invention. Thus, for instance, although described above primarily with reference to high precision apparatus for measuring only a very small range of departures from the level, it will be clear that the apparatus can be arranged to measure much larger inclinations with a lower degree of accuracy, if desired, and such a modification may often be preferred in the case when the output is used to effect automatic control of the level of the surface on which the apparatus rests.

What I claim as my invention and desire to secure by Letters Patent is:

1. A suspension device, comprising a supporting framework, a movable mass, five filaments, means for anchoring the five filaments to the supporting framework and to the movable mass whereby the movable mass is suspended from the framework by the five filaments, the relative dispositions of the filaments fulfilling the following requirements:
   (a) All five filaments are in tension;
   (b) Not more than three filaments lie along concurrent straight lines;
   (c) Not more than three filaments are coplanar;
   (d) The vertical straight line through the centre of gravity of the movable mass passes between the anchorages of the five filaments both to the movable mass and to the framework;
   (e) Two of the filaments are oppositely inclined to the vertical plane through the centre of gravity of the movable mass at right angles to the direction of movement of the mass;
   the movable mass having one degree of freedom relatively to the supporting framework.

2. A suspension device as claimed in claim 1, in which in the zero position of the movable mass, the five filaments lie along straight lines all of which intersect a single straight line, whereby the one degree of freedom for the movable mass is rotational about an instantaneous axis extending in the direction of such single straight line.

3. A suspension device as claimed in claim 1, in which in the zero position of the movable mass, three of the filaments lie in a first plane and the other two in a second plane, whereby the one degree of freedom for the movable mass is rotational about an instantaneous axis extending in the direction of the line of intersection of the two planes.

4. A suspension device as claimed in claim 3, in which in at least one of the two planes two filaments are oppositely inclined to the line of intersection of the two planes.

5. A suspension device as claimed in claim 3, in which, in the first plane, two of the filaments have their anchorages to the movable mass in close proximity to one another and are inclined to one another at a substantial angle and the third filament is anchored to the movable mass at a point remote from the anchorages of the first two filaments thereto.

6. A suspension device as claimed in claim 1, in which the one degree of freedom for the movable mass is translational (in the sense that every straight line of the mass remains parallel to its original direction throughout the movement), such movement being compounded of a main translational movement in a generally horizontal direction and a relatively small translational movement in a generally vertical direction.

7. A suspension device as claimed in claim 6, in which, in the zero position, the five filaments lie in three parallel planes at right angles to the direction of the main translational movement, two of the filaments being in one plane, two in another plane and the fifth in the third plane.

8. A suspension device as claimed in claim 7, in which in each of the first two planes the two filaments are anchored to the movable mass in close proximity to one another and are oppositely inclined to a straight line parallel to the fifth filament, and the fifth filament is anchored to the movable mass at a point remote from the straight lines joining the anchorages in the first two planes.

9. A suspension device as claimed in claim 6, in which, in the zero position, the five filaments lie in not less than two parallel planes at right angles to the direction of the main translational movement.

10. A suspension device as claimed in claim 1, including stops on the framework for substantially preventing movement of the movable mass in directions other than the operative direction of movement.

11. A suspension device as claimed in claim 10, including stops on the framework for limiting the range of movement of the movable mass in the operative direction of movement.

12. Apparatus for indicating level or measuring departure therefrom, including in combination with a suspension device as claimed in claim 1, electric transducer means responsive to the operative movement of the movable mass relative to the supporting framework and giving an electrical output which is a measure of the inclination to the vertical of a datum axis on the framework.

13. Measuring or indicating apparatus as claimed in claim 12, in which the electric transducer means comprises two transducers each having its two relatively movable members carried respectively by the framework and by the movable mass, the two transducers being differentially responsive to the operative movement of the movable mass relatively to the framework, and means for combining the outputs of the two transducers to give the resultant output representative of the inclination of the datum axis.

14. Measuring or indicating apparatus as claimed in claim 12, including stops on the framework for substantially preventing movement of the movable mass in directions other than the operative direction of movement.

15. Measuring or indicating apparatus as claimed in claim 12, including stops on the framework for substantially preventing movement of the movable mass in directions other than the operative direction of movement, and further stops on the framework for limiting the range of movement of the movable mass in the operative direction.

16. Measuring or indicating apparatus as claimed in claim 12, including means for damping the movement of the movable mass whereby it will rapidly assume its operative position without appreciable oscillation about such position.

No references cited.